United States Patent
Wegener (12)

(10) Patent No.: US 9,120,112 B2
(45) Date of Patent: Sep. 1, 2015

(54) METERED LIQUID DISPENSING BOTTLE

(71) Applicant: Great Measures, LLC, Granger, IN (US)

(72) Inventor: John Andrew Wegener, Granger, IN (US)

(73) Assignee: Great Measures, LLC, Granger, IN (US)

( * ) Notice: Subject to any disclaimer, the term of this patent is extended or adjusted under 35 U.S.C. 154(b) by 0 days.

(21) Appl. No.: 14/514,863

(22) Filed: Oct. 15, 2014

(65) Prior Publication Data

US 2015/0102068 A1    Apr. 16, 2015

Related U.S. Application Data

(60) Provisional application No. 61/891,646, filed on Oct. 16, 2013.

(51) Int. Cl.
*B67D 7/06*        (2010.01)
*B05B 11/00*       (2006.01)
*G01F 11/28*       (2006.01)

(52) U.S. Cl.
CPC ......... *B05B 11/3008* (2013.01); *B05B 11/0089* (2013.01); *G01F 11/286* (2013.01); *G01F 11/288* (2013.01)

(58) Field of Classification Search
CPC ..... G01F 11/286; G01F 11/288; G01F 11/44; G01F 11/02; G01F 11/28; B65D 47/122; B05B 11/0089

USPC ......... 222/205, 207, 211, 158, 434, 438, 522, 222/464.1, 523
See application file for complete search history.

(56) References Cited

U.S. PATENT DOCUMENTS

| | | | | |
|---|---|---|---|---|
| 3,190,505 | A * | 6/1965 | Arbitman et al. | 222/207 |
| 4,077,547 | A * | 3/1978 | Donoghue | 222/207 |
| 4,211,346 | A * | 7/1980 | Mehra et al. | 222/205 |
| 4,607,762 | A * | 8/1986 | Zulauf et al. | 222/48 |
| 5,127,553 | A * | 7/1992 | Weinstein | 222/158 |
| 5,224,632 | A * | 7/1993 | Murakami et al. | 222/205 |
| 5,261,569 | A * | 11/1993 | Sandwell | 222/205 |
| 5,381,930 | A * | 1/1995 | Kalabakas | 222/205 |
| 5,833,124 | A * | 11/1998 | Groves et al. | 222/158 |
| 5,967,377 | A * | 10/1999 | Glynn | 222/158 |
| 6,330,960 | B1 | 12/2001 | Faughey et al. | |
| 6,334,550 | B1 * | 1/2002 | De Backer | 222/205 |
| 7,097,071 | B2 * | 8/2006 | Anderson et al. | 222/1 |
| 8,267,282 | B2 * | 9/2012 | Pai | 222/158 |
| 8,434,647 | B2 * | 5/2013 | Aamar | 222/207 |
| 8,579,164 | B1 * | 11/2013 | Sanguinet et al. | 222/207 |

* cited by examiner

*Primary Examiner* — Frederick C Nicolas
(74) *Attorney, Agent, or Firm* — Botkin & Hall, LLP

(57) ABSTRACT

A fluid dispensing container is provided having a telescoping reservoir where compressing the reservoir drives fluid from the container and through a tube, where it empties into another reservoir. The other reservoir is moveable where the opening at the top of the tube can be moved relative to the bottom of the other reservoir. When the compression is removed, fluid is pulled back down through the tube and stops when the fluid level in the other reservoir reaches the top of the tube.

20 Claims, 6 Drawing Sheets

METERED LIQUID DISPENSING BOTTLE

CROSS REFERENCE TO RELATED APPLICATIONS

This application claims the benefit of U.S. Provisional Application No. 61/891,646 filed Oct. 16, 2013, the disclosures of which are hereby incorporated by reference.

BACKGROUND OF THE INVENTION

The present disclosure relates to a bottle which dispenses measured amounts of liquid from a container. Previous bottles have been provided which measure a specific amount of liquid, but all are difficult to use. As such, an improved bottle is needed which accurately measures out liquid at a user-selected volume.

SUMMARY OF THE INVENTION

The present disclosure describes a bottle having an upper reservoir. The upper reservoir is graduated; the reservoir includes markings identifying fluid volumes which a user can "dial in" to select a volume which the bottle will dispense to the reservoir. A straw connects the upper reservoir to the lower reservoir, and allows fluid communication therebetween. The straw includes an overflow inlet, such that if more liquid than is desired is dispensed from the bottle to the reservoir, the excess liquid will pass through the overflow inlet back to the bottle.

One advantage of the bottle of the present disclosure is that it provides for easy clean-up and quick error and spill free measurement. Another advantage of the bottle of the present disclosure is that the bottle is refillable and reusable. These and other advantages will be apparent in light of the present disclosure.

BRIEF DESCRIPTION OF THE DRAWINGS

A preferred embodiment of this invention has been chosen wherein.

DESCRIPTION OF THE PREFERRED EMBODIMENT

Figure 1:
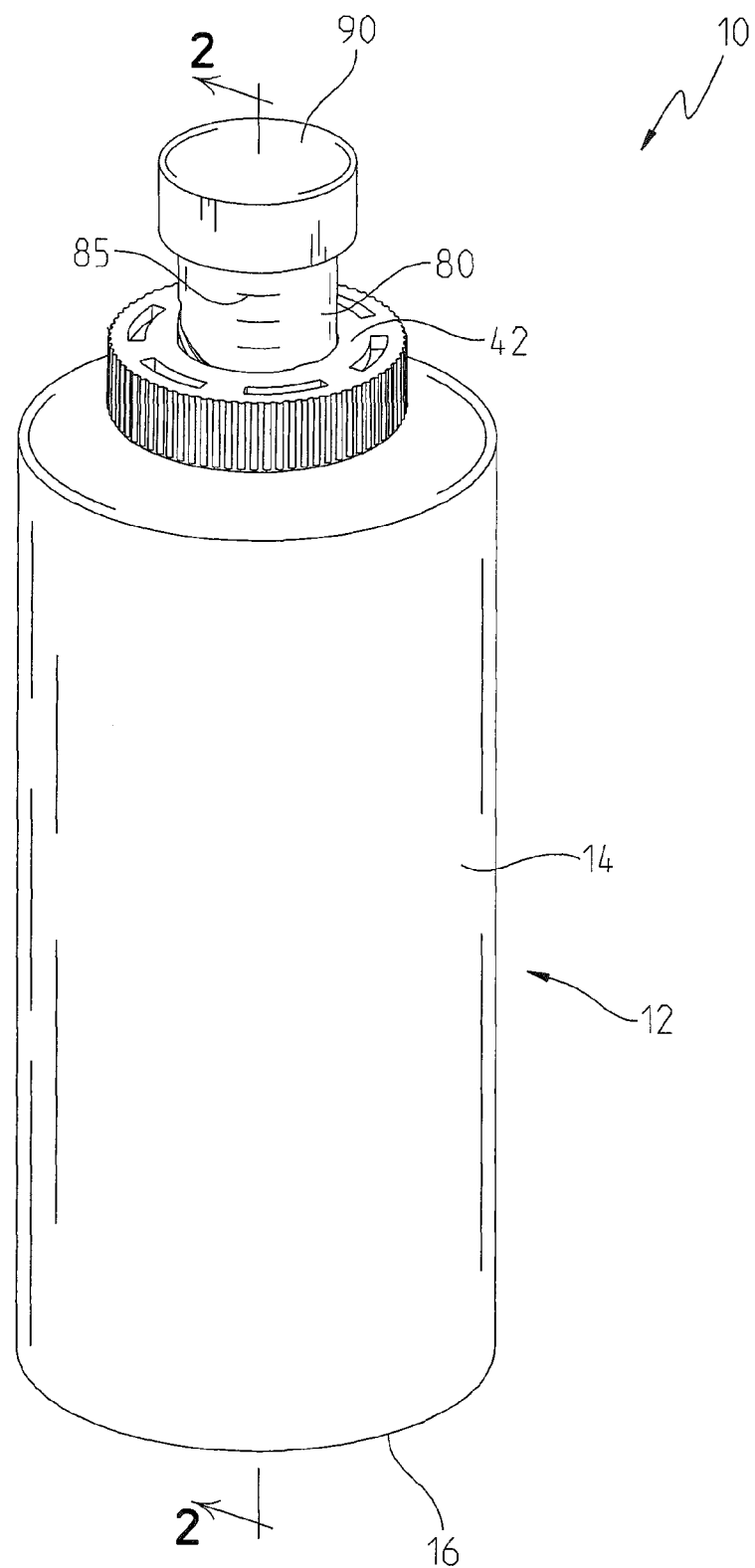
FIG. 1 is an isometric side view of the device.

An adjustable metered dispensing system 10 is shown in FIG. 1. The system 10 has a bottle 12 as a first reservoir. The bottle 12 is for storing a fluid to be dispensed. The bottle 12 has a bottom 16, an outside diameter 14, and a top portion. In the top portion, there is a vertical wall terminating in an opening 20, FIG. 5. On the vertical wall and adjacent to the opening 20 is a threaded portion 22. At the top of the opening 20 is an upper sealing surface 26. The bottle 12 is formed of a resilient material and can be translucent. It is formed of a material that can tolerate being compressed or squeezed without cracking or breaking. The bottle 12 is shaped to sit upright with the opening 20 facing up to receive, store, and transport fluid.

Figure 6:
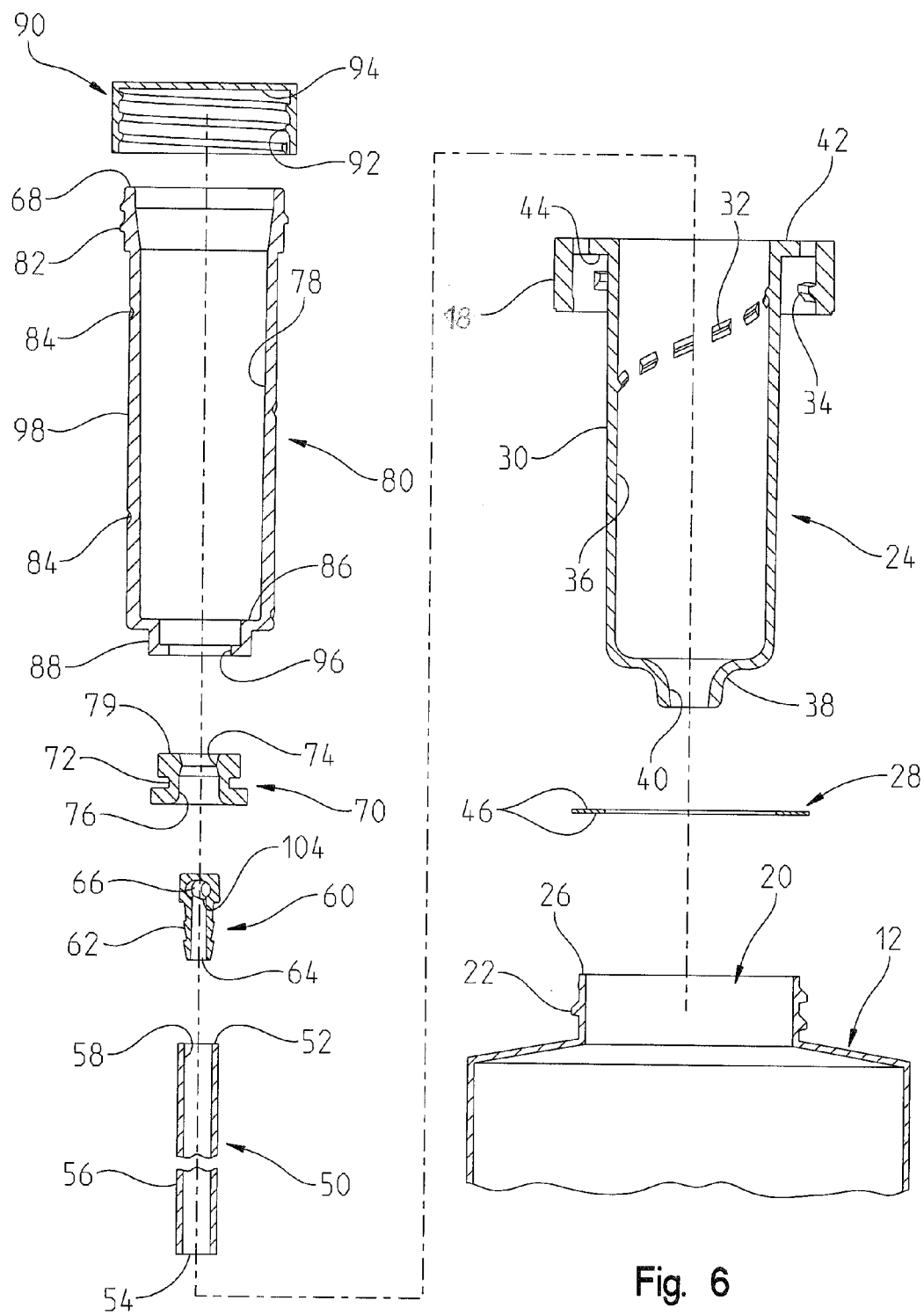
FIG. 6 is an exploded section view of the device in FIG. 1.

A dry sleeve 24 has an outside diameter 30 and an inside diameter 36, FIG. 6. At the top of the sleeve is a threaded portion 34 that is designed to mate with the threaded portion 22. Adjacent to the threaded portion 34 is a sealing surface 44. The sealing surface 44 is designed to mate with a sealing surface 46 of a gasket 28. The gasket 28 is also designed to mate with the sealing surface 26. A good seal is necessary between the sealing surface 44, the gasket 28, and the sealing surface 26 to prevent leakage. On the inside diameter 36 of dry sleeve 24 are inwardly protruding threads 32. At the bottom 38 of dry sleeve 24 is an opening 40. The dry sleeve 24 has a top surface 42 with holes. The dry sleeve 24 has a knurl 18 that is directly opposite the threaded portion 32 and adjacent to the top surface 42. The dry sleeve 24 is a dry reservoir but does not have any direct contact with fluid on the inside diameter. The inwardly protruding threads 32 are a reverse thread. The opening 40 in the dry sleeve 24 is sized smaller than a tube 50.

The tube 50 FIG. 6, has a bottom 54 that is designed to pickup fluid. The tube 50 has a wall with an outside diameter 56 and an inside diameter 58. The tube 50 includes a top 52, where fluid can exit. Inserted in the tube 50 is a diverter 60. The diverter 60 has a barb 62 that is designed to press-fit into the tube 50. The outside diameter of the barb 62 is larger than the inside diameter 58 of the tube and seals to the tube 50 when inserted. The diverter 60 has an internal bore 64 that extends up through the central diameter and terminates in a cross bore 66. The cross bore 66 is designed to redirect fluid that is traveling through the tube 50. The opening 40 in the dry sleeve 24 is sized smaller than a tube 50.

As installed, the diverter 60 is carried at the opening of the top 52 of the tube 50. The diverter 60 is generally cylindrical, having an inlet 64 and cross bore 66. The diverter 60 is defined by a wall which defines an internal passage. The internal passage is generally T-shaped, having an oppositely directed cross bore 66 formed at the upper end of the internal passage. The oppositely cross bore 66 each have a lower surface. The internal passage extends to the bottom inlet 64 of the diverter 60. The diverter 60 is defined by two portions, a lower plug and an upper head. The lower plug preferably includes a series of annular barbs 62, such that when the diverter 60 is inserted in the tube 50, the barbs 62 serve to hold the diverter 60 in a seated position in the tube 50. The internal passage of the diverter 60 is in fluid communication with the hollow pathway of the tube 50. The cross bore 66 is directed perpendicularly to the height of the bottle, such that when liquid is forced from the bottle 12 to the dispensing reservoir 80, the liquid does not spray up and out of the dispensing reservoir 80, but instead is directed toward the inside diameter 78, whereby the orientation of the cross bore 66 prevents spillage of the liquid when dispensed from the bottle 12. It is contemplated that the diverter 60 is integral to the top of the tube 50, where the tube is closed off and a hole is created through the wall of the tube from the inside diameter 58 to the outside diameter 56.

Figure 5:
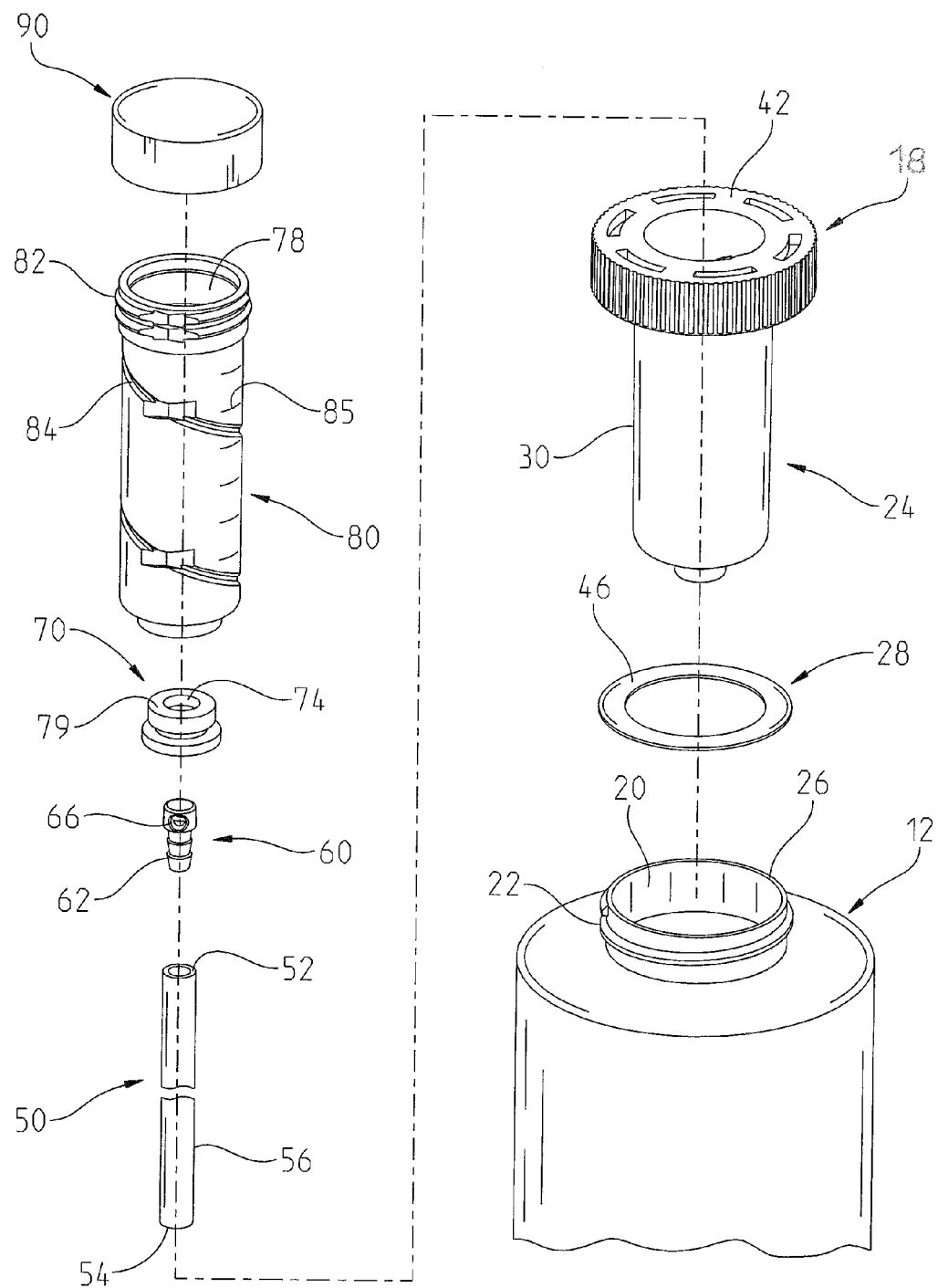
FIG. 5 is an exploded isometric view of the device in FIG. 1.

A dispensing reservoir 80 has an outside wall with a groove 84, FIG. 6 cut into the wall. In the upper portion is an outside thread 82 that is adapted to receive a cap 90. The groove 84 is cut reverse thread with respect to the outside thread 82 and is sized to mate with the inwardly protruding threads 32 on the dry sleeve 24. Adjacent to the outside thread is a top surface 68 that encircles an opening. Graduated lines 85, FIGS. 1 and 5, are marked on the outside diameter 98. The outside diameter 98 is sized to fit inside the dry sleeve 24, specifically adjacent to the inside diameter 36. At the bottom of the reservoir is a flat surface 86 that intersects another smaller diameter 88. At the bottom of the smaller diameter 88 is a ledge with an opening 96. The smaller diameter 88, ledge, and opening 96 are adapted to mate with a seal 70. The seal 70 has an internal diameter 74, a lead-in 76 and an outside diameter with a cut-in 72. The seal 70 has a top surface 79 that is flush with the flat surface 86 when it is installed into the dispensing reservoir 80. The lead-in 76 is tapered to allow the diverter 60 and tube 50 to pass through during assembly of the assembly. The internal diameter 74 is sized to allow the dispensing reservoir 80 and seal 70 to slide along the tube 50 as the dispensing reservoir 80 is rotated and moved relative to the dry sleeve 24. The internal diameter 74 seals to the outside diameter 56 of the tube. The cut-in 72 seals to the opening 96 when it is assembled to the dispensing reservoir 80. Additionally, the cut-in 72 provides retention for the seal 70 in the dispensing reservoir 80.

A cap 90 is adapted to mate and seal to the dispensing reservoir 80. The cap 90 has internal threads 92 that are complimentary to the outside thread 82 and has a sealing surface 94. When the cap 90 is affixed to the dispensing reservoir 80, the sealing surface 94 is abutted and sealed to the top surface 68. It is contemplated that the cap 90 is a dispensing nozzle to precisely direct the metered fluid instead of simply pouring it from the dispensing reservoir 80. To use a dispensing nozzle, the user would compress the bottle 12 while holding the can inverted. This would place the fluid in the bottle away from the bottom 54 of the tube, allowing air to move through the tube 50, driving the fluid out of the dispensing reservoir 80. The dispensing nozzle would thread on similarly to the cap 90, but would have a fluid outlet port. It is further contemplated that the dispensing reservoir 80 would have an integral nozzle and the cap 90 would be fitted over the nozzle tip. The nozzle could be opened or closed with a removable nozzle cap or a be a twist-on/twist-off style.

Figure 2:
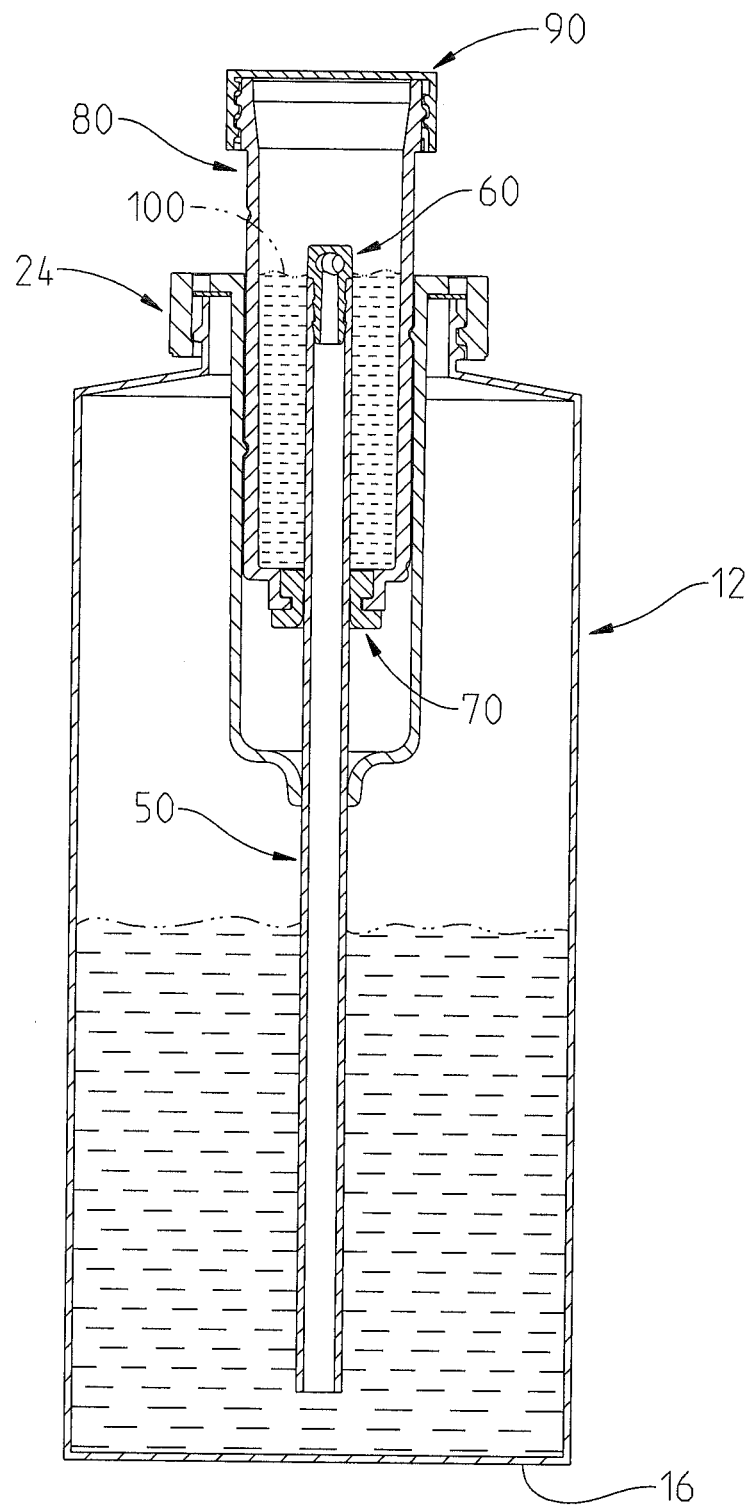
FIG. 2 is a side section view of the device.
Figure 3:
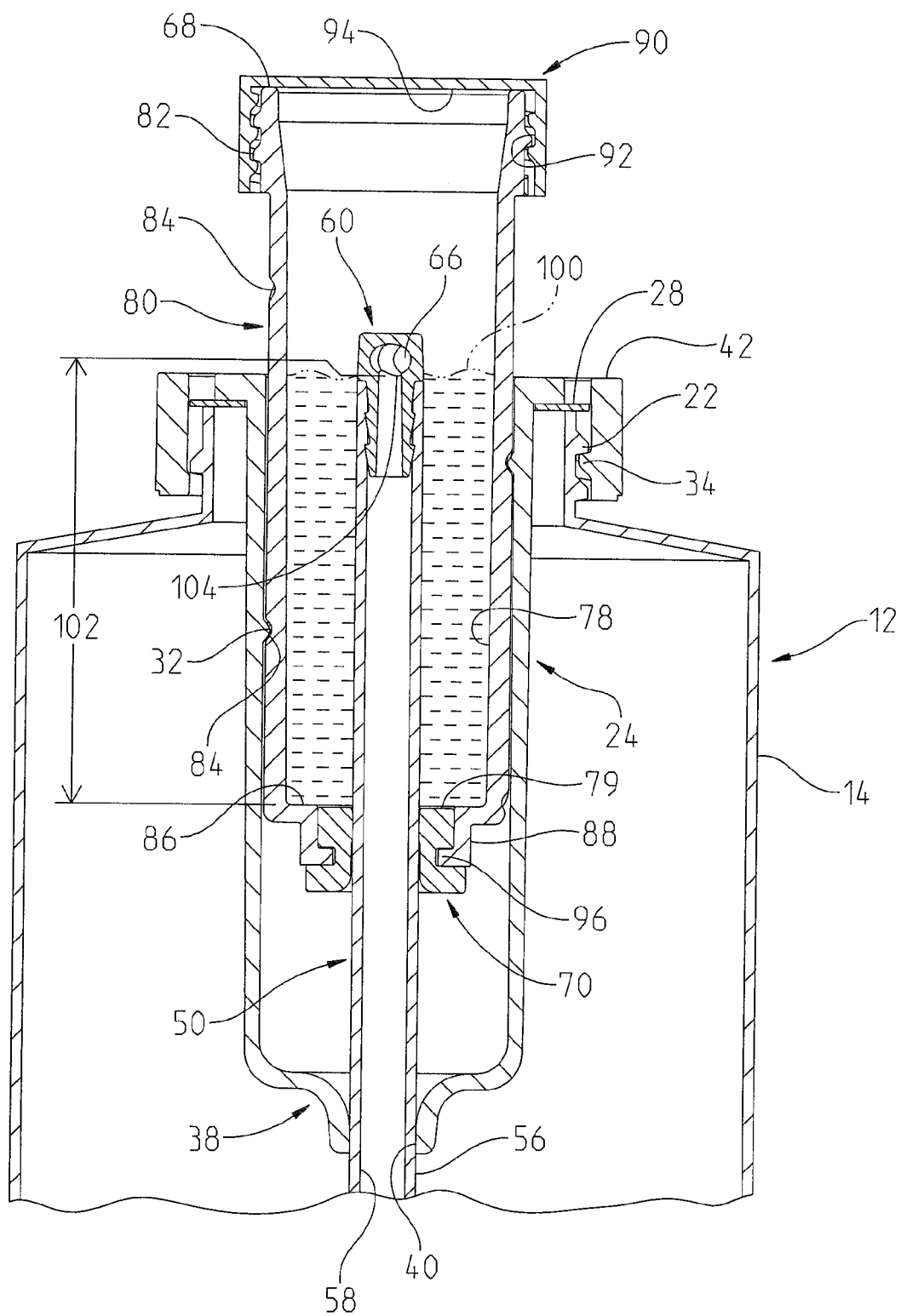
FIG. 3 is a partial view of the device in FIG. 2 showing a large dispense setting.
Figure 4:
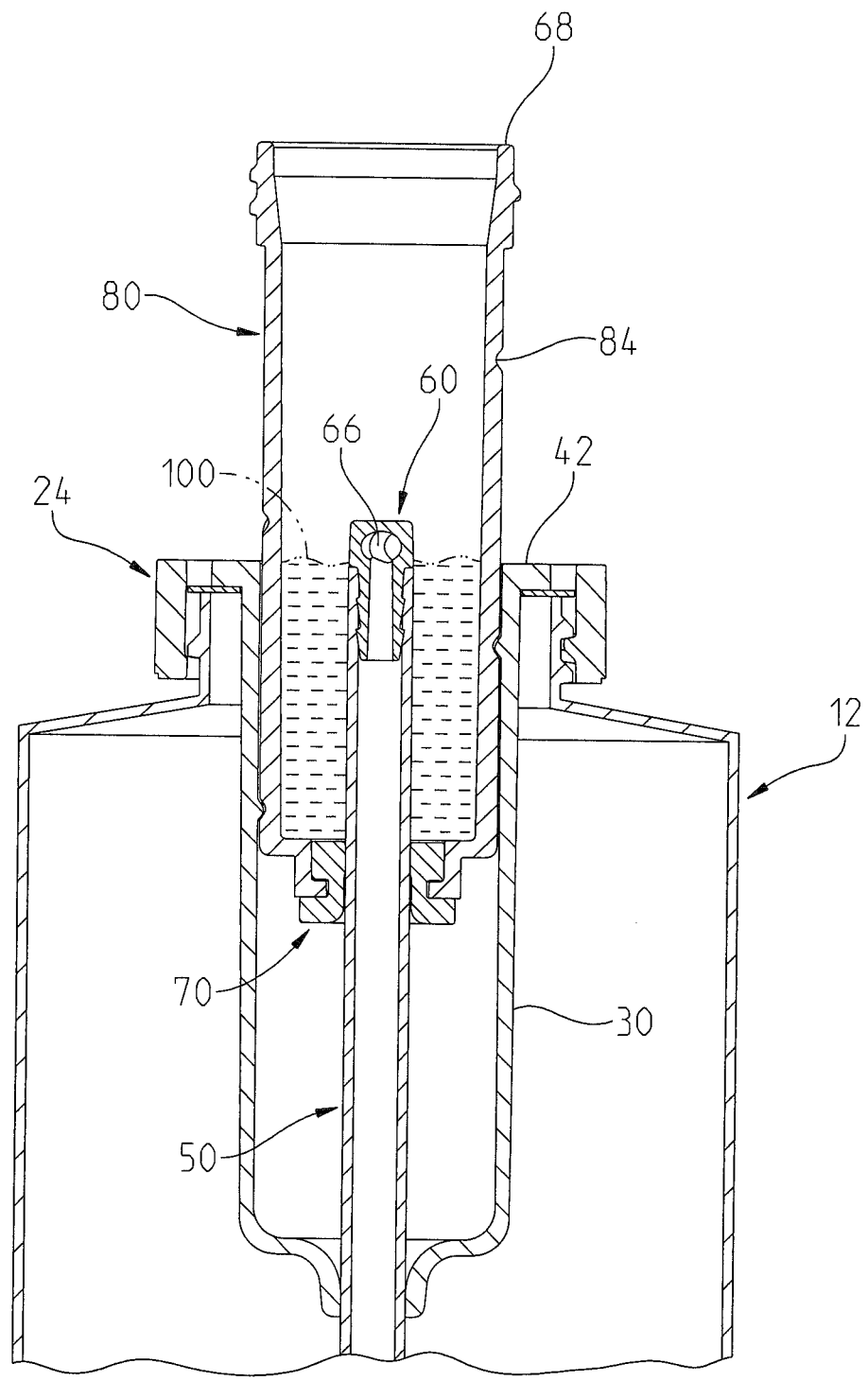
FIG. 4 is a partial view of the device in FIG. 2 showing a small dispense setting.

The bottom of the openings to the flat surface 86 is a depth 102, FIG. 3. The depth 102 is adjustable based on the position of the dispensing reservoir 80 inside the dry sleeve 24, FIG. 2. The depth 102 and inside diameter 78, minus the volume consumed by the portion of the tube 50 that is inside the dispensing reservoir 80, FIG. 3, define the potential volume of fluid that will be dispensed. As the dispensing reservoir 80 is moved vertically with respect to the tube 50 and the dry sleeve 24, the amount to be dispensed is lessened because the depth 102 is reduced. The maximum amount of fluid to be dispensed will occur when the dispensing reservoir 80 is fully seated inside the dry sleeve 24.

The top surface 42 is used for a reference mark for the graduated lines 85 on the dispensing reservoir 80. The user first rotates the dispensing reservoir 80 (moving it vertically) in relation to the dry sleeve 24 to select the desired metered amount. Because the tube 50 is fixed with relation to the dry sleeve 24, movement of the dispensing reservoir 80 changes the potential volume to be dispensed. The graduated line that lines up with the top surface 42 represents the amount of fluid that will be dispensed. The user then compresses the bottle 12 to drive the fluid through the tube and diverter. The seals prevent leakage, thereby driving all fluid up through the tube 50. The fluid travels vertically and then is diverted through the diverter 60 where it begins to fill the dispensing reservoir 80. The user will continue to compress the bottle 12 until the fluid reaches above the bottom 104, FIG. 3, of the cross bore 66. At that point in time, the user can release the compression on the bottle 12, thereby drawing any excess fluid back down through the diverter 60 and tube 50. The fluid level 100, FIG. 3, will reduce down to the same level as the depth 102. At that point in time, the user can simply pour the contents of the dispensing reservoir 80 and repeat the process as many times as desired.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An adjustable metered dispensing bottle adapted to dispense a predetermined amount of fluid, said bottle comprising:
    a first vessel capable of storing fluid and formed of a resilient material with a closed bottom and having an interior to define a first chamber, said first vessel having a top terminating at an opening;
    a second vessel having an interior having a floor and defining a second chamber, and an outside diameter adapted to be received in said first vessel, said second vessel having a lower opening being telescopically slidable with respect to said first chamber;
    a tube in fluid communication with said first chamber, having an opening located in said second chamber, said second vessel in fluid communication with said tube, said second vessel slidably sealing with respect to said tube, said opening being fixed with respect to said first vessel;
    said second vessel movable between a raised and lowered position, said second chamber having a depth defined by a distance between said floor and said opening of said tube, said raised position having a relatively low depth corresponding to a relatively small dispensed amount of said fluid, said lowered position having a relatively high depth corresponding to a relatively large dispensed amount; and
    when said first vessel contains said fluid and is compressed, said fluid is driven through said tube and into said second vessel and to a first fluid level, when said compression is released, said fluid is drawn back into said first vessel until said fluid reaches a second fluid level defined by the volume of said second vessel between said bottom of said second vessel and opening of said tube.

2. The adjustable metered dispensing bottle of claim 1, said opening of said tube including a diverter located at a top having an inlet opening in fluid communication to an outlet opening, said outlet opening angled with respect to said inlet opening.

3. The adjustable metered dispensing bottle of claim 2, said second vessel including a seal between said second vessel and said tube.

4. The adjustable metered dispensing bottle of claim 3, said dispensing bottle having a removable cap, said cap having a threaded portion adapted to threadably mate with a top portion of said second vessel.

5. The adjustable metered dispensing bottle of claim 4, said cap including a nozzle capable of dispensing said fluid from said second vessel.

6. The adjustable metered dispensing bottle of claim 1, and a dry vessel disposed between said first and second vessel, said dry vessel having an interior defining a dry chamber, said dry vessel adapted to be received in said opening of said first vessel, said dry vessel having a lower opening, said dry vessel having an inside diameter with protruding helical ridges, said second vessel adapted to be received by said dry vessel.

7. The adjustable metered dispensing bottle of claim 6, said second vessel having an outside diameter with helical grooves adapted to be threadably received in said chamber of said dry vessel.

8. The adjustable metered dispensing bottle of claim 7, said helical grooves and ridges being a reverse thread where clockwise rotation of said second vessel with respect to said dry vessel moves said second vessel from said lowered position to said raised position.

9. An adjustable metered dispensing bottle adapted to dispense a predetermined amount of fluid, said bottle comprising:
a first vessel capable of storing fluid and formed of a resilient material with a closed bottom and having an interior to define a first chamber, said first vessel having a top terminating at an opening;
a dry vessel having an interior defining a dry chamber, said dry vessel adapted to be received in said opening of said first vessel, said dry vessel having a lower opening, said dry vessel having an inside diameter with protruding helical ridges;
a second vessel having an interior defining a second chamber, said second vessel having an outside diameter with helical grooves adapted to be threadably received in said chamber of said dry vessel, said second vessel having a floor having a lower opening being telescopically slidable with respect to said dry chamber; and
a tube in fluid communication with said first chamber, having an opening located in said second chamber, said second vessel in fluid communication with said tube, said second vessel slidably sealing with respect to said tube, said tube being fixed with respect to said dry vessel.

10. The adjustable metered dispensing bottle of claim 9, said second vessel having a floor and movable between a raised and lowered position, said second chamber having a depth defined by a distance between said floor and said opening of said tube, said raised position having a relatively low depth corresponding to a relatively small dispensed amount, said lowered position having a relatively high depth corresponding to a relatively large dispensed amount.

11. The adjustable metered dispensing bottle of claim 10, said opening of said tube including a diverter located at a top having an inlet opening in fluid communication to an outlet opening, said outlet opening angled with respect to said inlet opening.

12. The adjustable metered dispensing bottle of claim 11, said second vessel including a seal between said second vessel and said tube.

13. The adjustable metered dispensing bottle of claim 12, said tube having an outside diameter larger than said lower opening in said dry vessel.

14. The adjustable metered dispensing bottle of claim 13, said helical grooves and ridges being a reverse thread where clockwise rotation of said second vessel with respect to said dry vessel moves said second vessel from said lowered position to said raised position.

15. The adjustable metered dispensing bottle of claim 9, when said first vessel contains fluid and is compressed, said fluid is driven through said tube and into said second vessel and to a first fluid level, when said compression is released, said fluid is drawn back into said first vessel until said fluid reaches a second fluid level, said second fluid level defined by the volume of said second vessel between said bottom of said second vessel and an opening at a top of said tube.

16. The adjustable metered dispensing bottle of claim 9, said second vessel having a top with a threaded portion, and a removable cap having a threaded portion adapted to be threadably received by said top of said second vessel.

17. The adjustable metered dispensing bottle of claim 16, said cap including a nozzle capable of dispensing fluid from said second vessel.

18. An adjustable metered dispensing bottle adapted to dispense a predetermined amount of fluid, said bottle comprising:
a first vessel capable of storing fluid and formed of a resilient material with a closed bottom and having an interior to define a first chamber, said first vessel having a top terminating at an opening;
a dry vessel having an interior defining a dry chamber, said dry vessel having an open top and adapted to be received in said opening of said first vessel, said dry vessel having a lower opening, and an inside diameter with protruding helical ridges, said dry vessel having a top reference surface;
a second vessel having an interior having a floor and defining a second chamber, and an outside diameter with helical grooves adapted to be threadably received in said chamber of said dry vessel, said second vessel having a lower opening being telescopically slidable with respect to said dry chamber, said second vessel having graduated lines partially circumscribing said outside diameter;
a tube in fluid communication with said first chamber, having an opening located in said second chamber, said second vessel in fluid communication with said tube, said second vessel slidably sealing with respect to said tube, said tube being fixed with respect to said first vessel; and
said second vessel movable between a raised and lowered position, said second chamber having a depth defined by a distance between said floor and said opening of said tube, said raised position having a relatively low depth corresponding to a relatively small dispensed amount, said lowered position having a relatively high depth corresponding to a relatively large dispensed amount; and
when said first vessel contains fluid and is compressed, said fluid is driven through said tube and into said second vessel and to a first fluid level, when said compression is released, said fluid is drawn back into said first vessel until said fluid reaches a second fluid level defined by the volume of said second vessel between a bottom and an opening at a top of said tube.

19. The adjustable metered dispensing bottle of claim 18, said second vessel having a top with a threaded portion, and a removable cap having a threaded portion adapted to be threadably received by said top of said second vessel.

20. The adjustable metered dispensing bottle of claim 18, said dispensing bottle having a removable cap, said cap having a threaded portion adapted to threadably mate with a top portion of said second vessel.

* * * * *